US012743954B2

(12) United States Patent
Kube et al.

(10) Patent No.: US 12,743,954 B2
(45) Date of Patent: Sep. 22, 2026

(54) METHOD AND DEVICE FOR DETERMINING A QUALITY VALUE OF A PARKING SPACE

(71) Applicants: CARIAD SE, Wolfsburg (DE); Volkswagen Aktiengesellschaft, Wolfsburg (DE)

(72) Inventors: Roland Kube, Wolfsburg (DE); Timo Iken, Wolfsburg (DE); Carolin Last, Wolfsburg (DE); Stefan Wappler, Wolfsburg (DE); Michael Holicki, Wolfsburg (DE); Ralph Hänsel, Wolfsburg (DE); Sven-Garrit Czarnian, Wolfsburg (DE); Thomas Dammeier, Wolfsburg (DE)

(73) Assignees: CARIAD SE, Wolfsburg (DE); Volkswagen Aktiengesellschaft, Wolfsburg (DE)

( * ) Notice: Subject to any disclaimer, the term of this patent is extended or adjusted under 35 U.S.C. 154(b) by 79 days.

(21) Appl. No.: 18/693,117

(22) PCT Filed: Sep. 19, 2022

(86) PCT No.: PCT/EP2022/075977
§ 371 (c)(1),
(2) Date: Mar. 18, 2024

(87) PCT Pub. No.: WO2023/046635
PCT Pub. Date: Mar. 30, 2023

(65) Prior Publication Data

US 2025/0006056 A1 Jan. 2, 2025

(30) Foreign Application Priority Data

Sep. 21, 2021 (DE) ......................... 102021124404.8

(51) Int. Cl.
*G08G 1/14* (2006.01)
*B60W 30/06* (2006.01)

(52) U.S. Cl.
CPC ............. *G08G 1/146* (2013.01); *B60W 30/06* (2013.01)

(58) Field of Classification Search
CPC ....... G08G 1/146; B60W 30/06; G06V 10/40; G06V 20/56
See application file for complete search history.

(56) References Cited

U.S. PATENT DOCUMENTS 11,532,097 B2 12/2022 Wilbers et al.
11,724,742 B2 8/2023 Feijoo et al.
(Continued)

FOREIGN PATENT DOCUMENTS

DE 10-2017-123848 A1 4/2019
DE 10-2018-118220 A1 1/2020

OTHER PUBLICATIONS

Schorner et al., “Park my Car! Automated Valet Parking with Different Vehicle Automation Levels by V2X Connected Smart Infrastructure,” 2021 IEEE International Intelligent Transportation Systems Conference (ITSC), Indianapolis, IN, USA, Sep. 19-22, 2021, pp. 836-843. (8 pages).
(Continued)

*Primary Examiner* — Daryl C Pope
(74) *Attorney, Agent, or Firm* — Seed Intellectual Property Law Group LLP

(57) ABSTRACT

Systems and methods of evaluating parking spaces are provided, and in particular evaluating parking spaces in parking lots or parking garages, with regard to autonomous driving. This is accomplished by determining an accessible area of the parking space, and defining grid points in the accessible area. Features of the parking space are determined
(Continued)

for each of the grid points, where each of the features is registrable from a respective one of the grid points. A quality value is obtained from an average number of features that is registrable from each of the grid points.

16 Claims, 2 Drawing Sheets

(56) References Cited

U.S. PATENT DOCUMENTS

2020/0294310 A1 9/2020 Lee et al.
2023/0091505 A1* 3/2023 Fujita ...................... B60R 99/00 701/23

OTHER PUBLICATIONS

Wu et al., "Automated Parking Space Allocation during Transition with both Human-Operated and Autonomous Vehicles," *Applied Sciences* 11(2), Jan. 18, 2021. (19 pages).

* cited by examiner

METHOD AND DEVICE FOR DETERMINING A QUALITY VALUE OF A PARKING SPACE

BACKGROUND

Technical Field

The present disclosure relates to a method for determining a quality value of a parking space, in particular of a parking lot or a parking garage, for autonomous driving. In addition, the present disclosure relates to a corresponding device for determining a quality value of such a parking space. Finally, the present disclosure also relates to a motor vehicle having such a device.

Description of the Related Art

Autonomously driving vehicles must continuously determine their position and orientation (pose) using suitable sensors and algorithms and, by comparing them with a digital map, ensure, among other things, that they are in an accessible area without static obstacles. For this purpose, the vicinity is continuously captured while driving using suitable sensors such as, for example, front or top view cameras. The resulting digital images are analyzed using suitable algorithms to identify distinctive image content, so-called features or landmarks (hereinafter collectively referred to as "features"), and to determine their position. The features are usually pixel patterns that appear in an image and are not necessarily assigned to a real object. The landmarks, on the other hand, are real objects such as, for example, areas, edges, lines, line intersections, bollards, signs, parking lot numbering and the like.

A localization algorithm compares the results with information from a digital map, which, in addition to the feature and landmark positions, also contains the respective feature and landmark type. Based on this additional information, it is possible to assign detected feature and landmark to the map's feature and landmark entries and to read out their absolute position. The vehicle position and vehicle orientation (pose) are determined by additionally taking into account the measured distance between the vehicle and detected landmarks.

The accuracy that can be achieved depends on the number of detectable features and landmarks in the vicinity of the vehicle. Since higher accuracy requirements apply in parking garages than on streets and freeways due to the tight curve radii and narrow lanes, the minimum number of features and landmarks within parking garages that have to be taken into account to determine the vehicle position and vehicle orientation is correspondingly high.

Against this background, it is of particular interest to be able to evaluate parking garages with regard to their suitability for autonomous vehicles and either release them directly or specifically equip them with additional features and/or landmarks.

Publication US 2020/0294310 A1 discloses a neural network that is used to determine the vertices of a skew polygon that delimits an area in an image that defines a parking lot. Furthermore, the neural network can output confidence values that predict the probability that vertices of an anchor box correspond to an entrance to a parking spot. The confidence values can be used to select a set of vertices of an anchor box and/or the skew polygon to define the entry to the parking spot. The minimum total distance between the vertices of a skew polygon predicted using the neural network and vertices of a parking spot can be used to simplify the decision as to whether an anchor box should be used as a positive sample for training.

BRIEF SUMMARY

Embodiments of the present can increase the safety when using parking space, especially for autonomous vehicles.

According to the present disclosure, a method for determining a quality value of a parking space, in particular a parking lot or a parking garage for autonomous or semi-autonomous driving, is provided. That is to say, a parking space should be evaluated using the quality value. For example, the quality value provides an indication as to whether the parking space is suitable for autonomous or semi-autonomous driving. The method can therefore be used for all levels of autonomy in automated driving.

The term "parking space" in this document is to be understood as a generic term for parking lots, parking garages, parking decks and other facilities for parking vehicles and in particular motor vehicles. The parking boxes or parking bays are usually identified by corresponding floor markings, which represent so-called landmarks.

In a first step of the method according to the disclosure, an entire accessible area of the parking space is determined. The entire accessible area usually comprises passageways, other accessible areas, parking areas (i.e., parking boxes or parking bays) as well as areas that can be accessed without permission. An autonomous or semi-autonomous vehicle must be able to orientate itself in this entire accessible area of the parking space. Preferably, this entire accessible area must also be able to be driven through by the autonomous or semi-autonomous vehicle. This determination of the entire accessible area of the parking space can be done by a vehicle or a special device that is maneuvered, for example, through the parking space or the parking garage. In individual cases, it may also be sufficient to use ready-made digital maps to determine the entire accessible area.

Grid points are then defined in the accessible area. That is to say, points are defined in the entire navigable space, which are subsequently used to determine the quality value. The purpose of these grid points is that the entire accessible area does not have to be evaluated with extremely high local resolution. Rather, for reasons of efficiency, a grid with more or less distant points is used in order to achieve sufficient safety during autonomous or semi-autonomous driving.

Features of the parking space that can be registered from the respective grid point are then determined for each of the grid points. Therefore, the analysis involves a determination which features can be registered (i.e., "seen" or "identified") from each grid point. All possible detector technologies can be used for this registration. For example, using a camera located at a height of one meter above ground, five features (e.g., landmarks) can be registered from a specific grid point in all special directions. With a radar detector it might only be two landmarks. In this example, with a camera at a height of 1.2 meters above ground, possibly six landmarks can be registered, four of which are in one half-space and the other two in the other half-space. This determination of the features or landmarks can be done by a detector device that is placed on all grid points in the parking space.

Finally, with this collected data, the quality value can be obtained from an average number of features that can be registered from each grid point (quality criterion). For example, for a parking garage it might be the case that an average of three features can be identified from each grid point, such as for a top view system that is located at a height of one meter above ground. For the same parking garage, it might be the case that an average number of 1.5 features can be detected or registered with a radar system. For example, in another parking garage, the average number of features that can be registered with a top view system may be four and the average number that can be registered with a radar system may be two. In this way, the different parking spaces or parking garages can be evaluated in terms of their usability for autonomous or semi-autonomous driving based on the quality value and, if necessary, in terms of the technology used.

In an advantageous configuration of the method according to the disclosure, the grid points are arranged equidistantly from one another. In particular, the grid points can be equidistant in one direction or in several directions of a plane. In particular, they can be equally spaced in the direction of each dimension according to a Cartesian coordinate system. The grid points are located at vertices of a square pattern. The grid points can also be arranged, for example, at vertices of equilateral triangles. This results, for example, in a network of grid points with triangular meshes. Here too, the individual grid points are equidistant. Such an equidistant grid point system has the advantage that, on the one hand, the grid points are easy to determine and, on the other hand, it makes it easier to compare different parking spaces.

In an exemplary embodiment, it can be provided that, when determining the features, either polar coordinates or Cartesian coordinates of each registerable feature are obtained in relation to the respective grid point in each case. By obtaining the coordinates of each registerable feature, additional valuable information is provided for navigating in the parking space. In addition, the visibility or registrability of the individual features from the respective grid points can also be estimated or calculated using the coordinates.

As already indicated above, in a specific exemplary embodiment it can also be provided that, when determining the features, for each feature, information is provided via one of several detector technologies with which the feature can be registered from the respective grid point, with the quality value being provided specifically for one or more of the detector technologies. That is to say, a different quality value can be determined for one and the same parking garage for vehicles with a top view system and for vehicles with a front camera system. This means that the quality value for a parking space can be determined on a vehicle-specific basis. This means that a parking space may be more suitable for an autonomous high-priced vehicle than for an autonomous low-priced vehicle.

The detector technologies for determining the features in the parking space can be based on visible light, infrared light, ultrasound, radar, or radio. If necessary, other technologies can also be used that make it possible to register or detect features of a parking space through contact or contactlessly.

According to an advantageous embodiment, it is provided that each of the features results in a specific pixel pattern or represents a landmark. This means that in the case of the pixel pattern, the recorded image and not a real, specific object is the focus of the detection. For example, with fixed lighting in a parking garage, due to, for example, the architecture, the building materials used, the existing shadows and the like a very specific pixel pattern is obtained in a specific viewing window, that can be used as a feature for autonomous driving. On the other hand, the feature can also be a specific real object such as a floor marking or a bollard. Even very specific sections of a floor marking, such as a corner of a parking area, can serve as a landmark. This means that numerous features can usually be registered in the vicinity of a grid point.

In an advantageous refinement it is provided that, when obtaining the quality value, a variance in the number of features that can be registered from each grid point is also taken into account. The variance is a measure of how much the number of features that can be registered from the individual grid points vary. A rather large variance can have a negative impact on autonomous driving because, despite a high average value, there may be areas in the parking space in which only a few features are visible or can be registered. However, if the variance is small, it can be assumed that the number of visible features at every grid point is the same in almost the entire parking space. In this respect, the variance is a reliable variable for evaluating the suitability of a parking space for autonomous driving, which results in an improved quality criterion.

In a further exemplary embodiment, a current occupancy status of the parking space is taken into account to obtain the quality value. If the occupancy status is high, parked vehicles may obscure landmarks or they change the so-called features (e.g., pixel pattern). This leads to the quality value decreasing and the parking space being judged as less suitable for autonomous driving. This is also desirable because the autonomous vehicle can actually identify fewer landmarks at the grid points due to obstructions caused by the motor vehicles and therefore has a harder time orienting itself. Furthermore, with regard to parking, it can also be advantageous if a heavily occupied parking garage only receives a low quality value.

According to a further aspect of the present disclosure, a method for navigating a motor vehicle is provided. Said method involves determining a first quality value of a first parking space according to a method as described above, checking whether the first quality value meets a first condition, and navigating the motor vehicle into the first parking space or releasing the first parking space for the motor vehicle, only if the condition is met. The determined quality value therefore has a direct effect on the navigation of the motor vehicle. If, for example, the quality value exceeds a predetermined minimum value, the motor vehicle is navigated into the first parking space. Otherwise the motor vehicle will not be navigated into the first parking space. In this case, the driver is informed, for example, that the first parking space will not be approached. As an alternative to navigating the motor vehicle directly into the first parking space, the first parking space can be released for the motor vehicle. If, for example, the quality value of the first parking space is above the predetermined minimum value, the first parking space is, in principle, released for a parking operation of the motor vehicle (e.g., corresponding release information is provided). If the minimum value is not exceeded, accordingly, the first parking space will not be released. The release can be used for navigating the motor vehicle at a later time.

According to a refinement of the method for navigating the motor vehicle, the first parking space is released, a second quality value of a second parking space is determined according to the above method, the first quality value is compared with the second quality value, and, depending on a corresponding comparison result, the motor vehicle is navigated into the first or second parking space. In this case, two parking spaces are available for navigating the vehicle. The first parking space is released because the first quality value of the first parking space meets the first condition. A second quality value is determined analogously for the second parking space. If the second quality value is greater than the first quality value, the motor vehicle is navigated, for example, into the second parking space. However, if the second quality value is smaller than the first quality value, the motor vehicle is navigated into the first parking space, regardless as to whether the second quality value meets the first condition or not. Alternatively, if there are several parking spaces, it is also possible, for example, to determine the maximum of the respective quality values and to navigate the motor vehicle into the parking space that has the maximum quality value. However, the motor vehicle is preferably only navigated into the parking space with the maximum quality value if this maximum quality value meets the first condition. Typically, autonomous use of the parking space only makes sense when this so-called first condition is met. For example, the first condition requires that at least three landmarks or features must be identifiable at each grid point and optionally the variance is less than 1.

Embodiments of the disclosure also provide a device for determining a quality value of a parking space, in particular of a parking lot or a parking garage, for autonomous driving, having:

- first sensor equipment that, in operation, determines an entire accessible area of the parking space,
- processing equipment that, in operation, defines grid points in the accessible area,
- second sensor equipment that, in operation, determines, for each of the grid points, features of the parking space that are registrable from the respective grid point, and computing equipment that, in operation, obtains the quality value from an average number of features that are registrable from each grid point.

The disclosure also includes refinements of the device according to the disclosure, which have features as have already been described in connection with the refinements of the method according to the disclosure. For this reason, the corresponding refinements of the device according to the disclosure are not described again here.

Furthermore, according to the disclosure, a device for navigating a motor vehicle is provided with a navigation device which is designed to carry out an above-mentioned method for navigating a motor vehicle. Such a navigation device can have a navigation apparatus and/or a processor and a memory storing instructions that, when executed by the processor causes the navigation device to navigate the motor vehicle semi-automatically or fully automatically or autonomously.

In addition, according to the disclosure, a motor vehicle is also provided which has such a device for navigating a motor vehicle The disclosure also comprises the combinations of the features of the described embodiments.

BRIEF DESCRIPTION OF THE SEVERAL VIEWS OF THE DRAWINGS

Exemplary embodiments of the disclosure are described below. In the figures.

DETAILED DESCRIPTION

Figure 1:
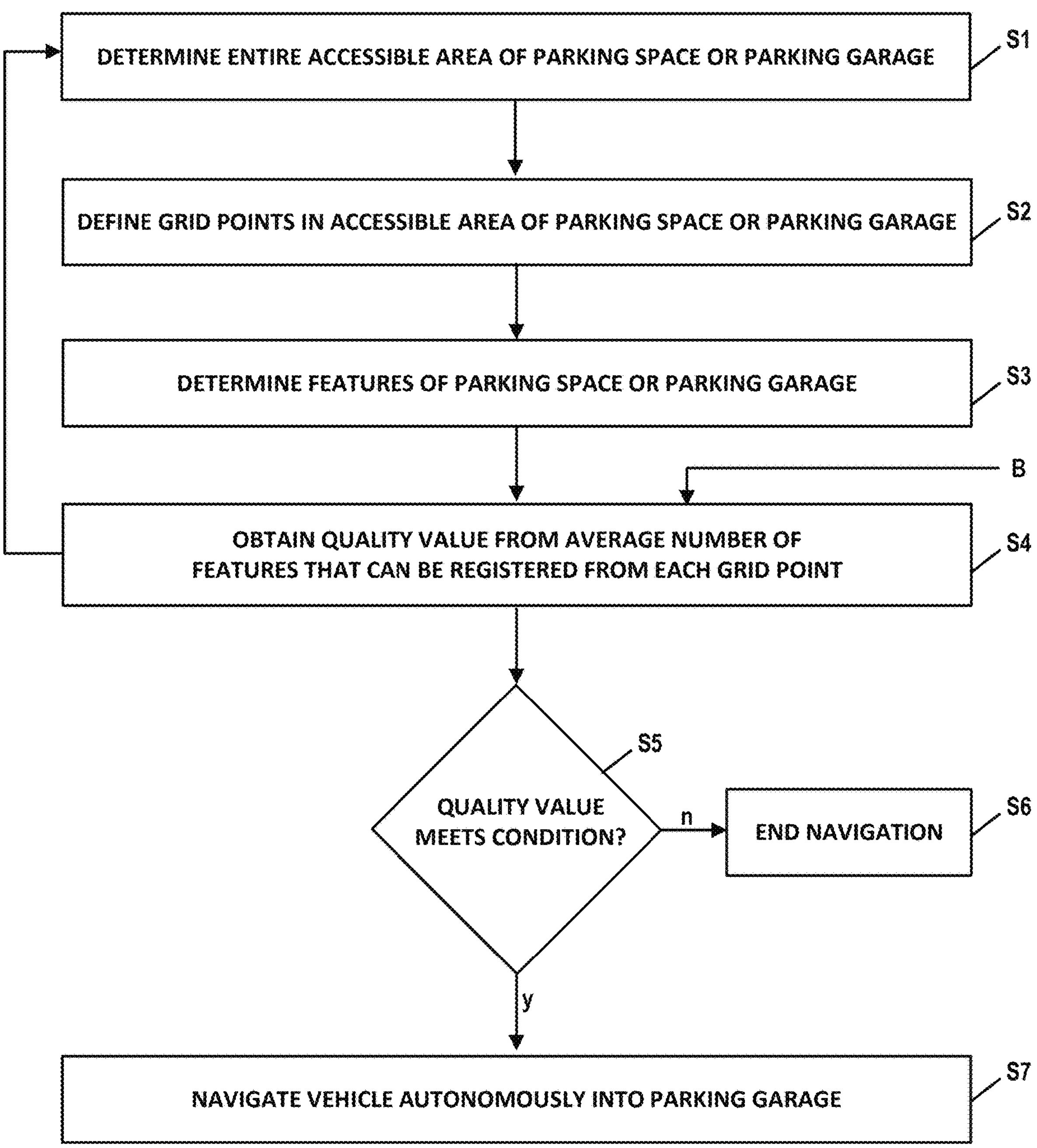
FIG. 1 shows a schematic block diagram of an exemplary embodiment of a method according to the disclosure.

The exemplary embodiments explained below are preferred exemplary embodiments of the disclosure. In the exemplary embodiments, each of the components described represents individual features of the disclosure that are to be viewed independently of one another, which also refine the disclosure independently of one another and are therefore to be viewed as part of the disclosure individually or in a combination other than that shown. Furthermore, the exemplary embodiments described can also be supplemented by further features of the disclosure that have already been described.

In the figures, functionally identical elements are each provided with the same reference numerals.

Autonomous (or semi-autonomous) vehicles must continuously determine their position and orientation using suitable sensors and algorithms and, by comparing with a digital map, ensure, among other things, that they are in a accessible area without static obstacles. For this purpose, the vicinity is continuously captured while driving using suitable sensors such as, for example, front or top view cameras. Radar and ultrasonic sensors are also used for this purpose. The resulting digital images are analyzed using suitable algorithms to identify distinctive image content, so-called features or landmarks, such as areas, edges, lines and line intersections, and to determine their position.

Usually, a localization algorithm compares the results with information from a digital map, which, in addition to the feature and landmark positions, also contains the respective feature and landmark type. Based on this additional information, it is possible to assign detected features and landmarks to the map's feature and landmark entries and to read out their absolute position. The vehicle position and/or vehicle orientation are determined by additionally taking into account the measured distance between the vehicle and detected landmarks.

The accuracy that can be achieved depends on the number of detected features and landmarks in the vicinity of the vehicle. Since higher accuracy requirements apply in parking garages and on parking lots than on streets and freeways due to the tight curve radii and narrow lanes, the minimum number of features and landmarks within parking garages or parking lots (in general parking spaces) that have to be taken into account to determine the vehicle position and/or vehicle orientation is correspondingly high.

Against this background, it is of particular interest to be able to evaluate parking garages with regard to their suitability for autonomous vehicles and either release them directly or specifically equip them with additional features and/or landmarks. However, it is desirable to dispense as much as possible with stationary sensor systems, which were previously necessary as a parking garage infrastructure in order to locate autonomous vehicles within the parking garage and to capture the vehicle position or orientation for this purpose.

To solve this problem, a method for determining a quality value of a parking space, in particular for evaluating parking garages, is hereby proposed. The evaluation should be carried out specifically with regard to the suitability for self-localization of autonomous vehicles, which is based on registerable or identifiable features (such as features and/or landmarks). The method preferably works with digital maps that contain a partition of the total parking garage area into lanes, other accessible areas, parking areas, areas that can be accesses without permission, and areas that are physically cordoned off and are therefore not accessible. The digital maps can be uploaded from a server or created individually. Both variants represent a determination of an entire accessible area of the parking space.

Excluding the physically cordoned off and therefore not accessible areas, the method creates a grid with equidistant vehicle positions and orientations over the entire parking garage area (i.e., accessible area of the parking space) and calculates the number of registerable features and landmarks (in particular, that are visible), for each point of the grid.

The extent to which a landmark or feature is visible or can be registered depends on the sensor system (usually the camera or cameras used). With top view views, an all-round view around the vehicle is possible. In this case, the orientation of the vehicle is not important and the field of view is limited vertically, if at all (e.g., +/−30 degrees). With simple front cameras on the interior mirror, however, the orientation of the vehicle is also important, because a field of view of such a camera is typically +/−60 degrees horizontally and +/−30 degrees vertically. On a one-way street, only those landmarks are visible to such a vehicle that are in front of the vehicle in the corresponding angular range in the direction of travel, but not landmarks that, from the view point of the vehicle, are hidden by other objects (e.g., walls). In this respect, the ability to register the features of the parking space depends on the sensor system of the vehicle or the vehicle type (e.g., top-view view possible or not). Specifically, the number of features that can be registered or that are visible from there (with the appropriate technology) is determined for each grid point.

Based on these results, a quality value is calculated, which takes into account the average number of visible features and landmarks per grid point and, if applicable, their variance within the analyzed parking area or parking space. The calculated quality value makes it possible to evaluate individual parking garages in terms of their suitability for a feature- and/or parking space-based self-localization of autonomous vehicles and to compare parking garages with each other in this regard. Such evaluations can be used directly to navigate a (partially) autonomous vehicle. For example, based on the respective quality value, it can be automatically determined into which of several evaluated parking garages the autonomous vehicle will be navigated.

FIG. 1 shows an exemplary embodiment of a method for determining a quality value of a parking space schematically in the form of a block diagram. For example, a parking garage should be evaluated with regard to autonomous or semi-autonomous driving. For this purpose, in a first step S1, the entire accessible area of the parking space or of the parking garage is determined. In a following step S2, preferably equidistant grid points are defined in the accessible area. These are located, for example, at the vertices of squares or triangles. Then, in a step S3, features of the parking space or parking garage are determined that are visible or can be registered from the respective grid point. Specifically, only the respective number of features can be determined that can be identified from the respective grid point. If necessary, in addition to the number, the type and position of each feature is also determined and saved.

In a further step S4, the quality value is obtained from an average number of features that can be registered from each grid point. Thus, an average value of the maximum number of features that can be identified from each grid point, is formed. This average value is characteristic of the parking garage or parking space. It can be stored in a server and accessed when necessary. Optionally, this determination of the quality value is repeated for at least one other parking garage or another parking space. To do so, the method jumps from step S4 back to step S1.

Furthermore, the occupancy state B of the parking garage can be taken into account when obtaining the quality value in step S4. For example, in case of high occupancy of the parking garage the quality value decreases.

If autonomous driving is intended, steps S5 to S7 may be added. First, in a step S5, it is checked whether the quality value obtained meets a condition. For example, it is checked whether the quality value is greater than a predetermined minimum value. Only if this condition is met, autonomous driving in the parking garage is possible safely. Otherwise, if the condition is not met, the parking garage will be classified as not accessible to autonomous traffic and will not be released. The navigation ends at this point with step S6. Otherwise, if the condition in step S5 is met, the vehicle can be navigated autonomously into the parking garage according to step S7. In the event that several parking garages are evaluated, those that do not meet the condition and are not released for autonomous driving can be discarded in step S6. If several parking garages are released for autonomous driving, navigation, in step S7, takes place to the parking garage that has the highest quality value. Alternatively, another condition can determine to which of the released parking garages the vehicle is navigated autonomously to. This additional condition can be, for example, the travel time, the distance and the like.

Figure 2:
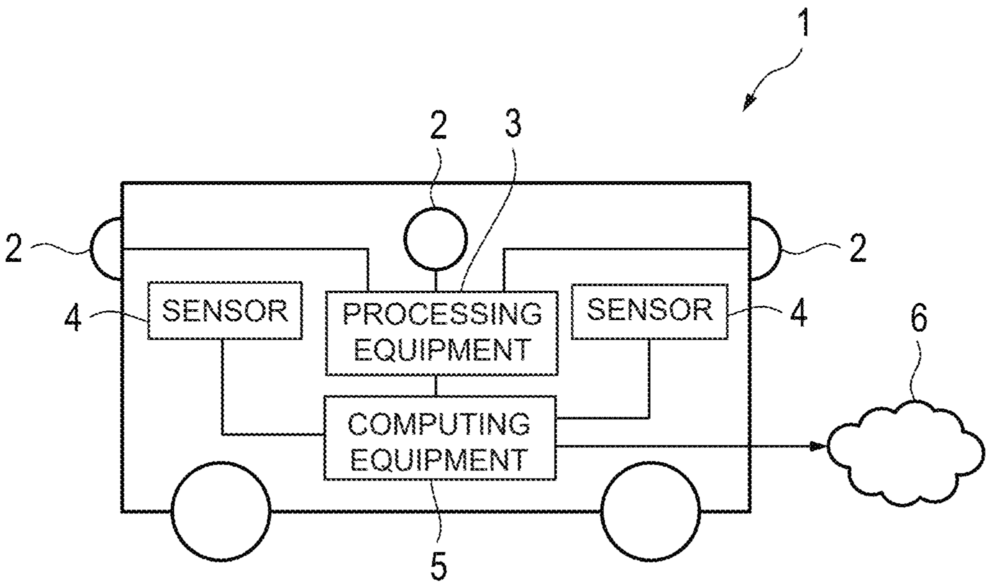
FIG. 2 shows an exemplary embodiment of a device for determining a quality value of a parking space.

FIG. 2 shows schematically a device 1 with which the quality value of a parking space for autonomous driving can be determined. This device 1 can, for example, be driven through the parking garage in order to capture the geometry, drivability and other features. This means that a digital map of the parking garage can be created with all visible or registrable features.

Device 1 has, for example, first sensor equipment 2 that determines the entire accessible area of the parking space. For this purpose, for example, first sensor equipment 2 comprises one or more cameras on several sides of the device 1. First sensor device 2 registers, for example, walls, bollards and road markings that delimit the accessible area.

In addition, device 1 has processing equipment 3 which can be used to define grid points in the accessible area. Processing equipment 3 (e.g., a processor) receives the accessible area of the parking space directly or indirectly from first sensor equipment 2. Furthermore, device 1 has second sensor equipment 4, which can be used to determine the number of features that can be identified from there and, if necessary, additional properties such as type and position for each of the grid points. Under certain circumstances, first sensor device 2 and second sensor device 4 are identical or partially identical to one another. Finally, device 1 has computing equipment 5 (e.g., a computing device having a processor and a memory storing instructions that, when executed by the processor, cause the computing device to perform the acts described herein) with which the quality value can be obtained from an average number of features that can be registered from each grid point. For this purpose, computing equipment 5 receives the grid points from processing equipment 3, and the information about the features that can be identified from each grid point from second sensor equipment 4. From this information, computing equipment 5 forms an average, which indicates how many features can be identified on average from each grid point. If necessary, computing equipment 5 also incorporates the variance of the number of identifiable features over old grid points in the quality value. In this case, the quality value can be multidimensional (quality vector). The determined quality value can be stored on a server in a cloud 6, for example.

Figure 3:
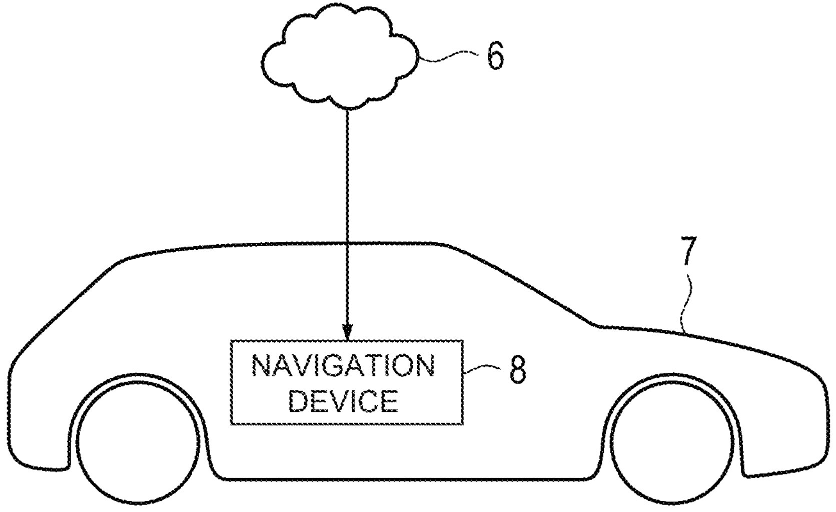
FIG. 3 shows a motor vehicle having a navigation device.

FIG. 3 shows a motor vehicle 7 having a navigation device 8. This navigation device 8 is able to navigate motor vehicle 7 autonomously. To navigate vehicle 7, navigation device 8 receives, for example, a quality value from cloud 6 about a parking garage. Depending on this quality value, navigation device 8 navigates the motor vehicle 7 autonomously, for example into a corresponding parking space or into one of several evaluated parking garages.

The present disclosure thus advantageously enables a grid of possible vehicle positions to be superimposed over the entire parking garage area, with the exception of the physically cordoned off and therefore not accessible areas. It also enables, for example, the calculation of the visible features and landmarks for each grid point and ultimately leads to a calculation of a quality value that includes the average number of visible features and landmarks per grid point and, optionally, their variance within the analyzed parking garage area. Finally, according to the disclosure, an objective evaluation of individual parking garages and an objective comparison of several parking garages with one another based on the calculated quality value are possible.

German patent application no. 102021124404.8, filed Sep. 21, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a quality value of a parking space, the method comprising:
- determining an accessible area of the parking space;
- defining grid points in the accessible area;
- determining features of the parking space for each of the grid points, wherein each of the features is registrable from a respective one of the grid points; and
- obtaining the quality value from an average number of features that is registrable from each of the grid points,
- wherein the determining the features includes:
  - obtaining either polar coordinates or Cartesian coordinates of each of the features in relation to the respective one of the grid points, or
  - for each feature of the features, providing information via one of several detector technologies with which the feature is registrable from the respective one of the grid points, and providing the quality value for one or more of the detector technologies.

2. The method according to claim 1, wherein the grid points are arranged equidistantly from one another.

3. The method according to claim 1, wherein each of the detector technologies is based on visible light, infrared light, ultrasound, radar, or radio.

4. The method according to claim 1, wherein each of the features results in a specific pixel pattern or represents a landmark.

5. A method for determining a quality value of a parking space, the method comprising:
- determining an accessible area of the parking space;
- defining grid points in the accessible area;
- determining features of the parking space for each of the grid points, wherein each of the features is registrable from a respective one of the grid points; and
- obtaining the quality value from an average number of features that is registrable from each of the grid points,
- wherein, the obtaining the quality value is based on:
  - a variance in a number of features that is registrable from each grid point, or
  - a current occupancy status of the parking space.

6. A method for navigating a motor vehicle, the method comprising:
- determining a first quality value of a first parking space by:
  - determining a first accessible area of the first parking space;
  - defining first grid points in the first accessible area;
  - determining first features of the first parking space for each of the first grid points, wherein each of the first features is registrable from a respective one of the first grid points; and
  - obtaining the first quality value from an average number of first features that is registrable from each of the first grid points;
- checking whether the first quality value meets a first condition; and
- in response to determining that the first quality value meets the first condition, navigating the motor vehicle into the first parking space or releasing the first parking space for the motor vehicle.

7. The method according to claim 6, wherein the first parking space is released, and the method further comprises:
- determining a second quality value of a second parking space by:
  - determining a second accessible area of the second parking space;
  - defining second grid points in the second accessible area;
  - determining second features of the second parking space for each of the second grid points, wherein each of the second features is registrable from a respective one of the second grid points; and
  - obtaining the second quality value from an average number of second features that is registrable from each of the second grid points; and
- comparing the first quality value with the second quality value; and
- navigating into the first parking space or the second parking space based on a result of the comparing.

8. A device for determining a quality value of a parking space, the device comprising:
- a first sensor device that, in operation, determines an accessible area of the parking space;
- a processor that, in operation, defines grid points in the accessible area;
- a second sensor device that, in operation, determines, for each of the grid points, features of the parking space that are registrable from a respective one of the grid points; and
- a computing device that, in operation, obtains the quality value from an average number of features that is registrable from each of the grid points,
- wherein, to determine the features, the second sensor device:
  - obtains either polar coordinates or Cartesian coordinates of each of the features in relation to the respective one of the grid points, or
  - for each feature of the features, provides information via one of several detector technologies with which the feature is registrable from the respective one of the grid points, and provides the quality value for one or more of the detector technologies.

9. A device for navigating a motor vehicle with autonomous or semi-autonomous steering, the device comprising:

a processor; and a memory storing instructions that, when executed by the processor causes the device to:

determine an accessible area of a parking space;

define grid points in the accessible area;

determine features of the parking space for each of the grid points, wherein each of the features is registrable from a respective one of the grid points;

obtain a quality value from an average number of features that is registrable from each of the grid points; and drive the motor vehicle based on the quality value, wherein, to determine the features, the processor:

obtains either polar coordinates or Cartesian coordinates of each of the features in relation to the respective one of the grid points, or for each feature of the features, provides information via one of several detector technologies with which the feature is registrable from the respective one of the grid points, and provides the quality value for one or more of the detector technologies.

10. A motor vehicle having the device according to claim 9.

11. The method according to claim 1, further comprising: autonomously or semi-autonomously driving based on the quality value.

12. A motor vehicle having the device according to claim 8.

13. A device for determining a quality value of a parking space, the device comprising:

a first sensor device that, in operation, determines an accessible area of the parking space;

a processor that, in operation, defines grid points in the accessible area;

a second sensor device that, in operation, determines, for each of the grid points, features of the parking space that are registrable from a respective one of the grid points; and a computing device that, in operation, obtains the quality value from an average number of features that is registrable from each of the grid points, wherein, the quality value obtained is based on:

a variance in a number of features that is registrable from each grid point, or a current occupancy status of the parking space.

14. A motor vehicle having the device according to claim 13.

15. A device for navigating a motor vehicle with autonomous or semi-autonomous steering, the device comprising:

a processor; and a memory storing instructions that, when executed by the processor causes the device to:

determine an accessible area of a parking space;

define grid points in the accessible area;

determine features of the parking space for each of the grid points, wherein each of the features is registrable from a respective one of the grid points;

obtain a quality value from an average number of features that is registrable from each of the grid points; and drive the motor vehicle based on the quality value, wherein, the quality value is obtained based on:

a variance in a number of features that is registrable from each grid point, or a current occupancy status of the parking space.

16. A motor vehicle having the device according to claim 15.

* * * * *